April 8, 1930.    R. J. EMMERT    1,753,560
WORK HANDLING APPARATUS
Original Filed Sept. 28, 1925    6 Sheets-Sheet 1

Inventor
Rodger J. Emmert
by Spencer Luvall & Hardman
his Attorneys

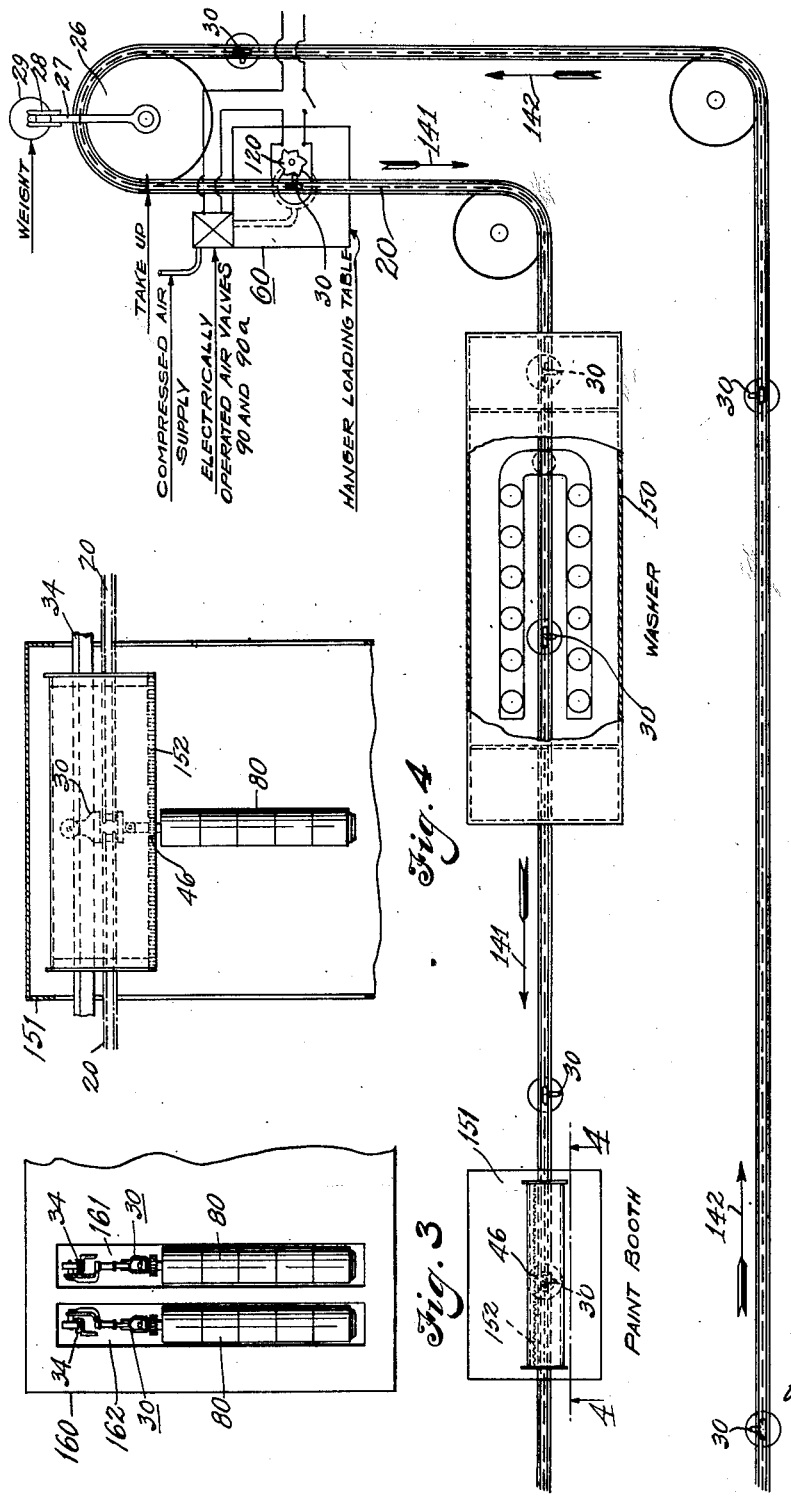

April 8, 1930.   R. J. EMMERT   1,753,560
WORK HANDLING APPARATUS
Original Filed Sept. 28, 1925   6 Sheets-Sheet 3

Inventor
Rodger J. Emmert
By Spencer Duvall & Hardman
his Attorneys

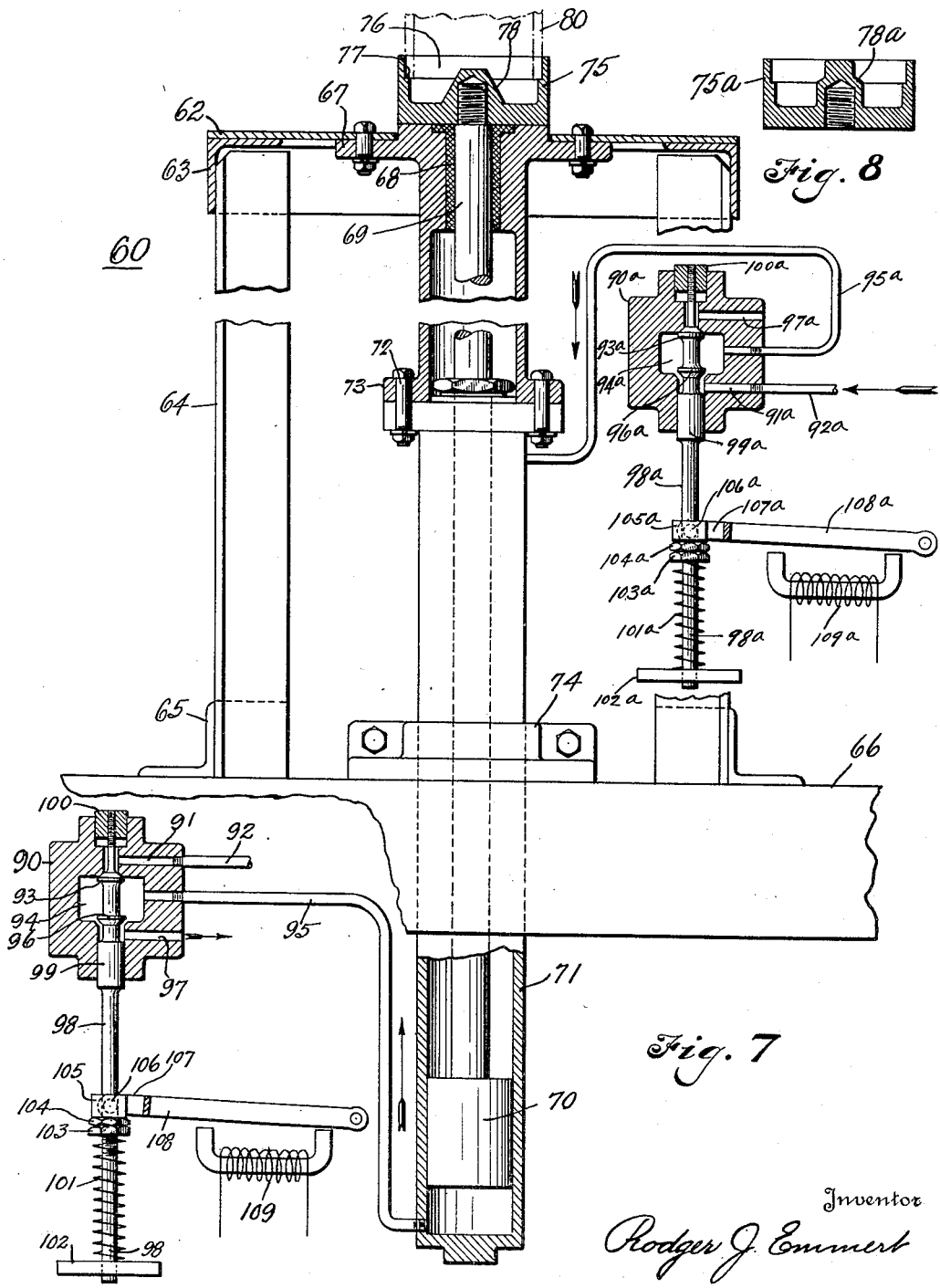

April 8, 1930.　　　　R. J. EMMERT　　　　1,753,560
WORK HANDLING APPARATUS
Original Filed Sept. 28, 1925　　6 Sheets-Sheet 5
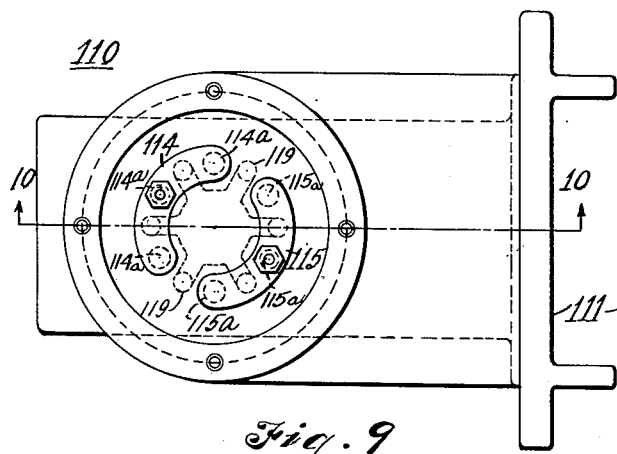
Fig. 9
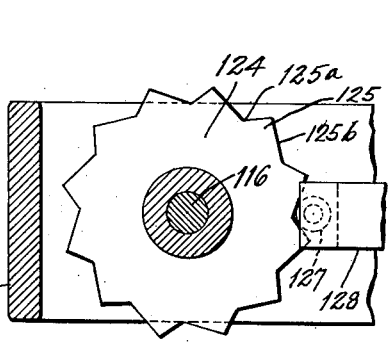
Fig. 11
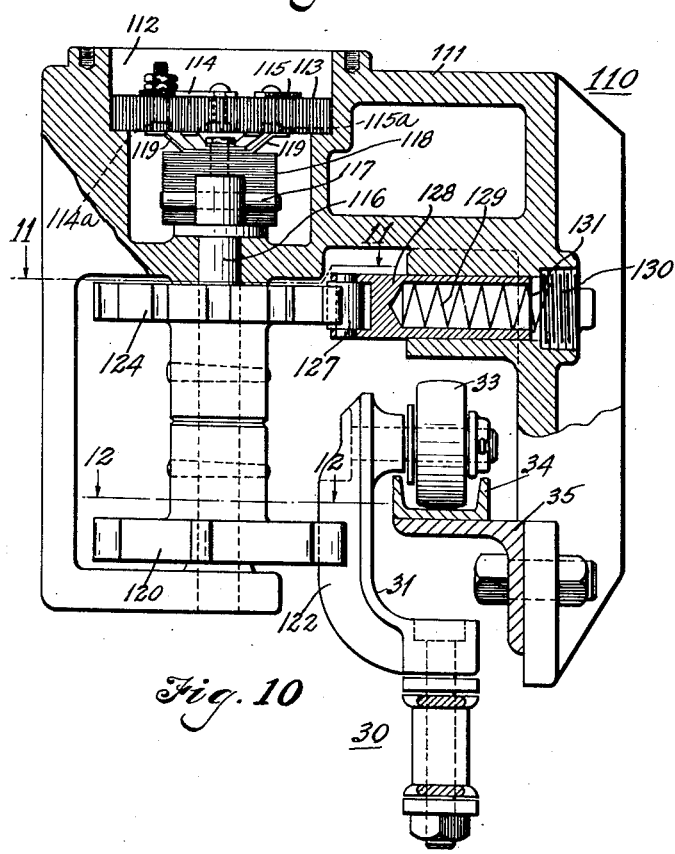
Fig. 10
Fig. 12
Inventor
Rodger J. Emmert
By Spencer Small & Hardman
his Attorneys April 8, 1930.  R. J. EMMERT  1,753,560
WORK HANDLING APPARATUS
Original Filed Sept. 28, 1925   6 Sheets-Sheet 6
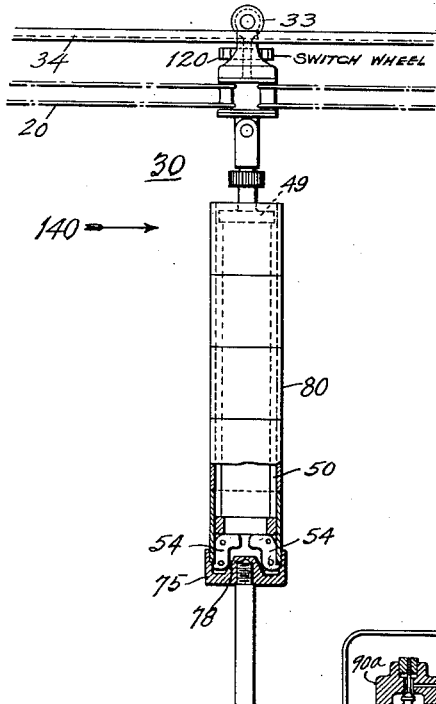
Fig. 13
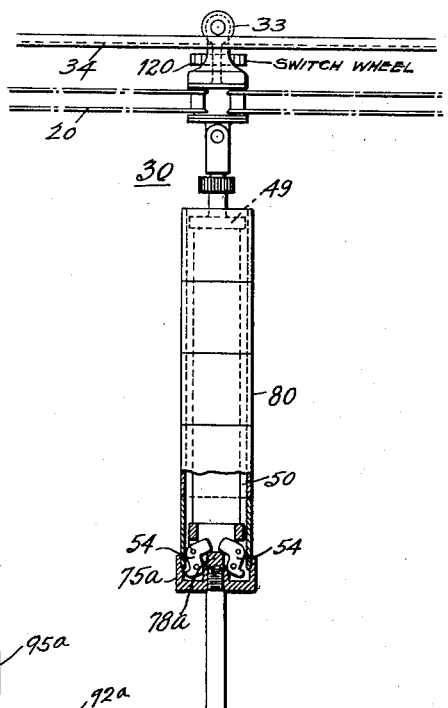
Fig. 14
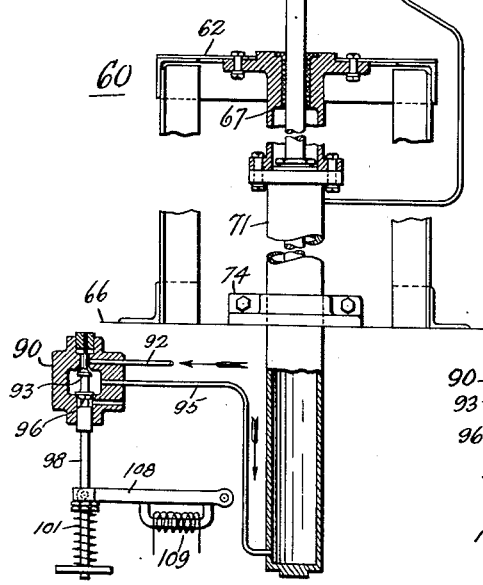
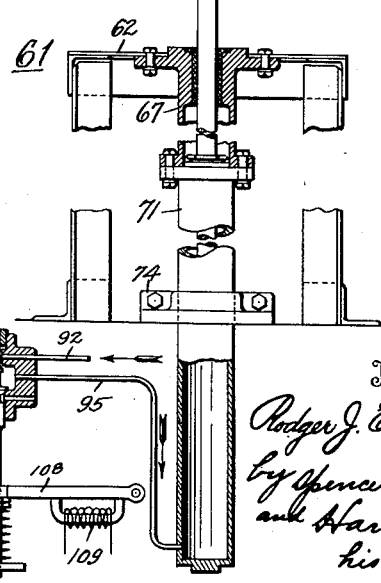
Inventor
Rodger J. Emmert
by Spencer Lundl
and Hardman
his Attorneys Patented Apr. 8, 1930

1,753,560

UNITED STATES PATENT OFFICE

RODGER J. EMMERT, OF DAYTON, OHIO, ASSIGNOR, BY MESNE ASSIGNMENTS, TO DELCO-REMY CORPORATION, OF DAYTON, OHIO, A CORPORATION OF DELAWARE

WORK-HANDLING APPARATUS

Application filed September 28, 1925, Serial No. 58,980. Renewed March 25, 1929.

This invention relates to work handling apparatus, and particularly to the handling of stacks of tubular bodies, such as the field frames of dynamos.

One of the objects of the present invention is to convey work pieces with a minimum of manual labor and supervision, successively, to various devices which operate upon the work pieces.

In carrying out this object, the invention provides an endless conveyor having a plurality of carriages for receiving stacks of work pieces, a loading platform and an unloading platform. Work pieces are stacked upon the loading platform and are automatically transferred to the carriage adjacent the loading table. After the work pieces on the carriage have been operated upon, and it is desired to remove them from the conveyor, the carriage moves adjacent an unloading platform and the work pieces on the carriage are automatically transferred from the carriage to the unloading platform.

A further object is to provide for rotation of the carriages while they are being moved bodily by the conveyor, so that all sides of the work pieces on the carriage may be operated upon from devices which are located only on one side of the conveyor. For example, if it is desired to paint the exterior of a stack of cylindrical bodies, the carriage is caused to move into a paint booth, and, while moving in the booth, the bodies are rotated, so that an operator may conveniently spray paint on all sides of the work pieces.

Further objects and advantages of the present invention will be apparent from the following description, reference being had to the accompanying drawings, wherein a preferred form of the present invention is clearly shown.

In the drawings:

Figs. 1 and 2 form a diagram showing a plan of the work handling apparatus included in the present invention;

Fig. 3 is a sectional view on line 3—3 of Fig. 1;

Fig. 4 is a sectional view on line 4—4 of Fig. 2;

Fig. 7 is a side elevation partly in section, showing the loading table and elevating platform and control therefor;

Fig. 8 is a sectional view of a work-receiving platform with which the unloading table is provided;

Fig. 9 is a top view of a switch which is controlled by the movements of the conveyor carriages;

Fig. 10 is a side view, partly in section of the switch shown in Fig. 9, the section being taken on the line 10—10 of Fig. 9;

Fig. 11 is a sectional view on the line 11—11 of Fig. 10;

Fig. 12 is a sectional view on line 12—12 of Fig. 10;

Figs. 13 and 14 are side views partly in section, showing respectively how the loading and unloading platforms cooperate with the carriages.

Figure 1:
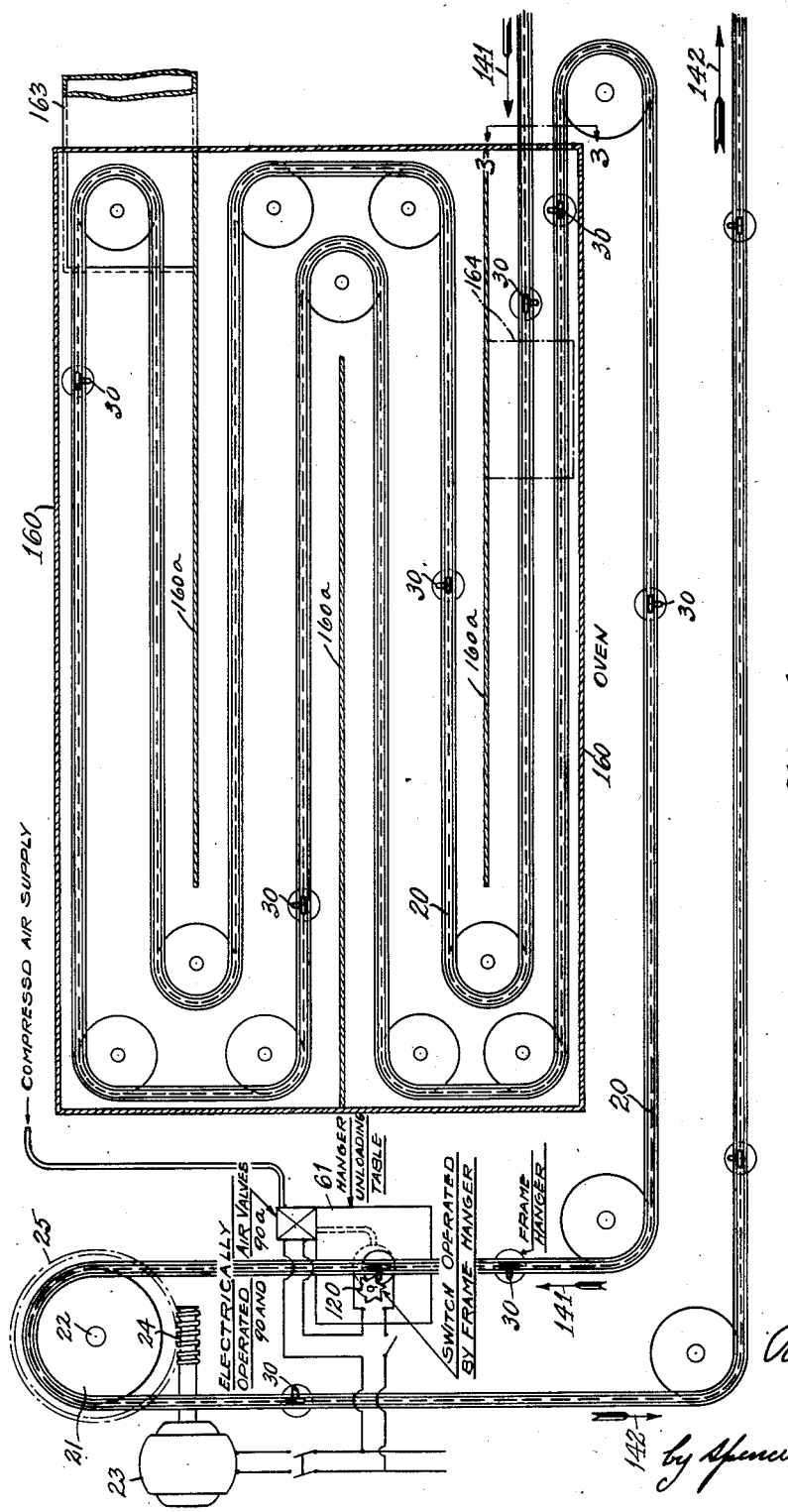

Referring first to Figs. 1 and 2, the conveyor comprises an endless chain represented by the broken line 20. The chain is roved around a plurality of sprocket wheels for changing the direction of the chain. One of these wheels is indicated at 21 in Fig. 1, and is connected with a shaft 22 which is operated by an electric motor 23 through a worm 24 and a worm gear 25. Another of the chain-guiding pulleys is indicated by numeral 26 in Fig. 2. This pulley 26 is the take-up pulley and is slidably mounted, and its axis is connected by a cable 27 which passes around a suitably-mounted pulley 28 and thence downwardly to a weight 29 which maintains the conveyor chain 20 under tension.

Figure 5:
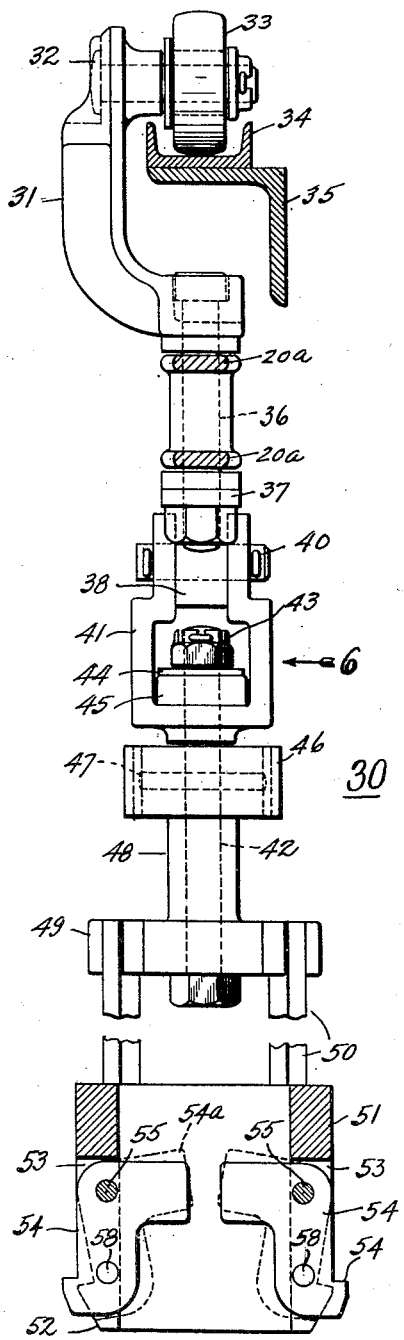
Fig. 5 is a side elevation of a conveyor carriage, showing the conveyor track in cross-section, and showing certain parts of the carriage in section.
Figure 6:
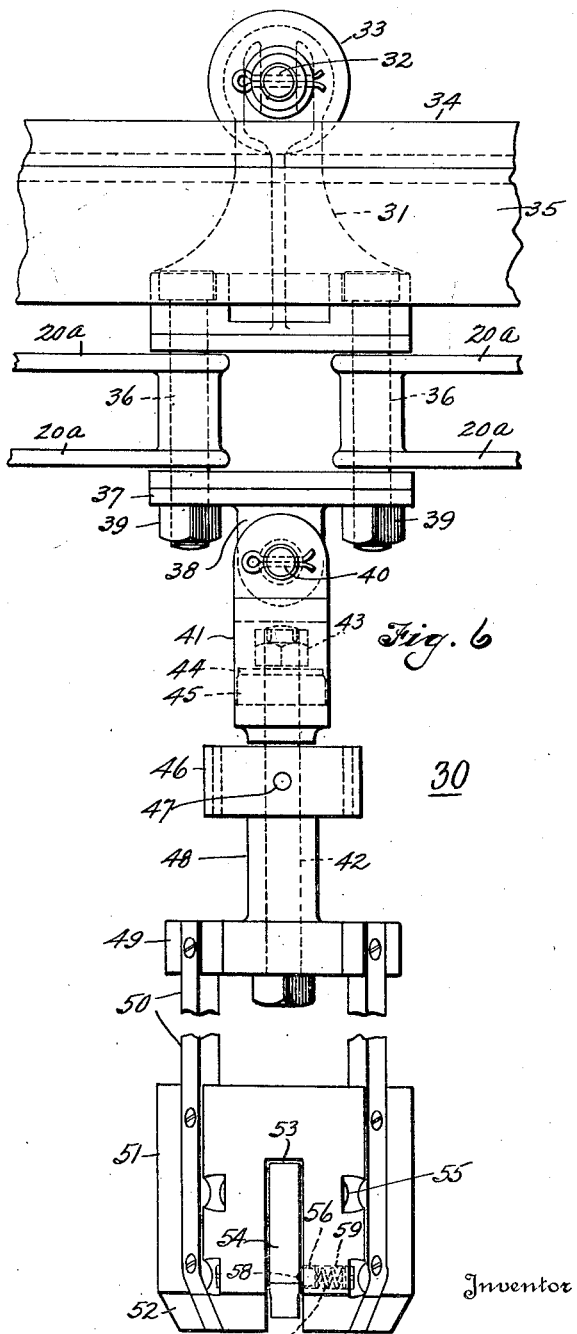
Fig. 6 is a view in the direction of arrow 6 in Fig. 5.

The conveyor chain moves a plurality of hangers 30, each including a bracket 31 carrying a pin 32 supported by a wheel 33 which travels in a track 34 of channel-shaped cross-section. The track 34 conforms with the direction of the chain 20, and is supported in any suitable manner, as by angle irons 35 which may be suspended from the ceiling of the room in which the apparatus is located. The bracket 31 supports two bolts 36 which pass through holes in the adjacent chain links 20ª, as shown in Fig. 6. The lower ends of the bolts 36 pass through a plate 37 having a lug 38; and plate 37 is supported upon the upper sides of nuts 39 threadedly engaging the lower ends of bolts 36. The lug 38 carries a pin 40 passing through the branches of a swivel link 41, the yoke of which is perforated to receive a bolt 42. The upper end of the bolt 42 threadedly engages a nut 43, and nut 43 rests on a washer 44 supported by a boss 45 integral with the yoke of link 41. The rod 42 is connected with a gear 46 by pin 47 and the hub 48 of the gear 46 is provided at its lower end with a flange 49. Spacing bars 50 connect the flange 49 with a latch frame 51 having its lower edge beveled to provide a conical surface 52. The latch frame is tubular and is provided with diametrically-opposite notches 53, each for receiving a latch lever 54 supported by a pin 55 which extends across the notch 53. Each lever 54 is movable into the full-line position shown in Fig. 5, or to the dotted-line position 54ª, and is yieldingly maintained in either position by a ball 56 which is pressed by a spring 57 toward and against the latch lever 54. A recess 58, formed in each lever 54, is adapted to receive its respective ball 56 when the lever is moved to the full line position, as shown in Fig. 5, so that said levers are held securely in this position, while supporting work pieces. The ball and spring are received by a socket 59 in the latch bracket 51.

The hangers 30 are adapted to cooperate with the elevating platform of the loading table 60, shown diagrammatically in Fig. 2, or with the transfer platform of the unloading table 61, indicated in Fig. 1. The loading table 60 will first be described with reference to Fig. 7. The table 60 includes a top 62 supported by a frame work of angle iron sides 63 and angle iron legs 64, which are secured by angle bracket 65 to the floor 66. The table top 62 supports a guide bracket 67 carrying a guide bushing 68 for a piston rod 69 attached at its lower end to a piston 70 which reciprocates in a cylinder 71 attached by bolts 72 to the flange 73 of the guide bracket 67. The cylinder 71 is also supported by a clamp bracket 74 supported by the floor 66. The rod 69 is threadedly connected with a transfer platform 75 which is provided with a recess 76 having two internal diameters defining an annular ledge 77. The recess 76 is adapted to receive a stack of cylindrical work pieces 80, the internal diameter of which is less than the smallest diameter of the recess 76, so that the bottom edge of the lowest work piece 80 rests on the ledge 77, but a portion thereof overhangs the recess 76, for a purpose to be described. Centrally thereof the transfer platform 75 is provided with a conical boss 78 adapted to cooperate with the latch levers 54 and to move them into work-engaging position, shown in Fig. 13, when the transfer platform is moved into the position shown in Fig. 13, by fluid pressure under the control of mechanism to be described.

The unloading table 61 is identical with the loading table 60 with the exception that the former is provided with a transfer platform 75ª which differs from the platform 75 only with respect to the central boss 78ª, which is shaped so as to move the latching levers to the position 54ª shown in Fig. 5, or into the position shown in Fig. 14, so as to permit the work pieces 80 to be transferred from the hanger 30 to the transfer platform 75ª.

Referring again to Fig. 7, the admission of fluid pressure to the lower end of the cylinder 71 is controlled by a valve 90 having an intake port 91 connected with a compressed-air inlet 92. The port 91 includes a valve seat for receiving an inlet valve 93 controlling the admission of fluid to the chamber 94 which is connected by a pipe 95 with the lower end of the cylinder 71. When the valve 93 is in the position shown in Fig. 7, an exhaust valve 96 is separated from its seat in order to provide for the passage of fluid from the cylinder 71 through pipe 95, chamber 94 and out through an exhaust passage 97. The valves 93 and 96 are integral with, or connected with, a valve stem 98 having cylindrical portions 99 and 100 which are guided by the frame of valve 90. The valve 93 is normally closed and the valve 96 is normally maintained open by a spring 101 which bears at its lower end against a bracket 102 and at its upper end against a nut 103 threadedly connected with the rod 98. The bracket 102 also provides a guide for the stem 98. A nut 104 is threadedly connected with the stem 98 and receives a block 105 carrying diametrically-opposite pins 106. Each pin 106 is connected with the branch 107 of a fork lever 108, which cooperates as an armature with an electromagnet 109. It is apparent that when the magnet 109 is energized, the armature 108 will be pulled downwardly to cause the valve 93 to open and the valve 94 to close. When this occurs, air under pressure will be delivered to the cylinder 71 to cause the transfer table 75 or 75ª to be elevated, so as to transfer the work to the hanger or from the hanger, depending on whether the hanger is at the loading station or at the unloading station.

The admission and exhaust of compressed air from the upper end of each of the cylinders 71 is controlled by a valve 90ª, similar to valve 90, and controlled by an electromagnet 109ª which is energized simultaneously with the magnet 109 controlling the same cylinder. A pipe 95ª leading to the upper end of each cylinder 71 is connected with valve 90ᵃ at the middle side opening thereof, but the air supply pipe 92 is connected with the lower side opening of the valve 90ᵃ instead of the upper side opening, as is the case with the connection of parts 90 and 92. Therefore, when the magnets 109 and 109ᵃ, controlling the same cylinder, are energized, as indicated in Fig. 13, air will be admitted to the lower end of the cylinder 71 to raise the piston 70 therein, and air will be exhausted from the upper end of the cylinder. Similarly, air will be admitted to the upper end of the cylinder and exhausted from the lower end when the magnets are deenergized and the springs 101 and 101ᵃ return the valve members 93 and 93ᵃ, respectively, to the positions shown in Fig. 7.

The circuit of the magnets 109 and 109ᵃ, controlling the same cylinder, is controlled by a switch designated as a whole by numeral 110 in Figs. 9 and 10. Switch 110 includes a frame 111 supported by one of the angle irons 35 which carry the conveyor track 34. The frame provides a recess 112 for receiving a non-conducting block 113 carrying on its upper surface two arcuate, conducting members 114 and 115 which are connected, through the block 113, each with three stationary contacts 114ᵃ and 115ᵃ, respectively. The bracket 110 supports a switch shaft 116 which is drivingly connected by a pin 117 with a non-conducting block 118 to which is attached a switch spider having six equidistant arms 119. The spacing of the arms 119 corresponds with the spacing of the contacts 114 and 115, so that when the shaft has been turned into a certain position, the contact 114 will be connected with the contact 115. Hence, each of the contacts 114 and 115 is engaged in three places, so as to ensure making electrical connections in case one of the switch spider arms should not function properly. The shaft 116 is driven by a notched wheel 120 having six equidistant projections 121 which are adapted to be engaged by a rib 122 integral with each bracket 31 of each hanger 30. As each hanger 30 travels along in the direction of arrow 123 in Fig. 12, the rib 122 will engage a projection 121 to cause the shaft 116 and a toothed wheel 124 to be rotated. Each tooth 125 of wheel 124 is defined by tooth surfaces 125ᵃ and 125ᵇ, which are so related that by the time a projection 121 has been moved by rib 122 about one-fourth of the spacing of projection 121 or 15 degrees, the surface 125ᵇ will be engaged by a spring-pressed roller 127 which is mounted on a slide 128 which receives a spring 129 which bears against a block 130 closing the end of a recess 131 which receives the slide 128. The spring 129 causes the roller 127 to bear against the surface 125ᵇ with pressure sufficient to produce counterclockwise rotation of the shaft 116 until the roller 127 bears also against a surface 125ᵃ of the adjacent tooth 125, which follows in a counterclockwise direction of rotation. There are twelve teeth 125 on wheel 124, so that each time a projection 121 of wheel 120 is moved 15° by reason of movement of a rib 122, the shaft will be moved 15° by the rib 122 and 15° more by the cooperation of the roller 127 and toothed wheel 124 just described. Therefore, at the end of the first quarter of the 60° movement of the wheel 120 by a rib 122, the switch contacts 114 and 115 will be suddenly bridged by the switch spider 119; during the second and third quarter of this movement of wheel 120 the contacts 114 and 115 will remain bridged; and at the end of this third-quarter movement, the spider 119 will be suddenly moved out of engagement with contacts 114 and 115.

The result of this operation is that the switch is quickly closed and opened to prevent undue arcing although the hanger rib 122 moves slowly, and the switch remains open or closed sufficiently long for the platforms to be raised and lowered before the next hanger moves adjacent a switch 110.

When the contacts 114 and 115 of each switch 110 are bridged by a spider 119, the magnets 109 and 109ᵃ which control the platform adjacent the switch will be energized so as to cause that platform to be elevated, as shown in Fig. 13. Then, when the circuit is interrupted between the contacts 114 and 115, the magnets 109 and 109ᵃ will become inactive and the springs 101 and 101ᵃ will restore the valves 90 and 90ᵃ to the condition shown in Fig. 7, so that the transfer platform will be lowered.

Referring more particularly to Figs. 13 and 14, it will be noted that the loading table 60 and the unloading table 61, and controls therefor, are identical, the only difference being in the construction of the transfer platforms 75 and 75ᵃ. As the hanger 30, shown in Fig. 13, moves in the direction of the arrow 140, it will operate the switch wheel 120 so as to cause the magnets 109 and 109ᵃ to be energized to cause the platform 75 to be elevated. The switch 110 is located relative to the loading table 60 so that when air is admitted to the cylinder 71, the hanger 30 will be located substantially vertically above the transfer platform 75. The switch wheel 120 will operate first to close the switch so that the transfer platform 75 will be elevated into the position shown in Fig. 13. The camming portion 78 thereof will engage the levers 54 to move them into the position shown in Fig. 13 and in full lines in Fig. 5, thereby causing the levers to engage the lower edge of the lowest one of the stack of tubular bodies 80. As the hanger 30 travels still further in the direction of the arrow 140, the switch wheel 120 will operate to open the switch, thereby causing the platform 75 to descend, so that another stack of work pieces 80 may be loaded thereon before the next hanger 30 has been moved adjacent the loading table 60.

The unloading apparatus works in a manner opposite from that of the loading apparatus. The hanger 30 moves a switch wheel 120 which controls a pair of magnets 109 and 109ª, controlling valves 90 and 90ª in the manner described in connection with the loading table 60, but the engagement of the lugs 78ª with the latching levers 54 causes them to be moved into the position shown in dotted lines in Fig. 5, or full lines in Fig. 14, so that they will no longer retain the stack of work pieces 80 upon the hanger 30. Therefore, when the switch wheel 120 located adjacent the unloading table 61 is operated by a hanger 30 to open the magnet circuits, the transfer platform 75ª will be caused to descend and carry with it the stack of work pieces 80 which are removed therefrom before the next hanger, laden with work pieces, comes vertically adjacent the unloading table 61.

Figs. 1 and 2 show the work handling apparatus applied to a plant for cleaning and painting the exteriors of tubular bodies, such as the field frames of dynamo-electric machines. A workman stands adjacent the loading table 60 and places on the loading transfer platform 75 a stack of five field frames. These frames are transferred automatically to one of the hangers 30 in the manner described, and the conveying chain 20 moves the hangers 30 in the direction of the arrows 141 successively through a washer 150, which cleans the exteriors of the field frames preparatory to taking a coat of paint, and then through a paint booth 151. As each hanger 30 moves through the paint booth 151, its gear 46 engages a rack 152 suspended within the paint booth in such a manner as to engage the gear 46. As the hanger 30 is pulled through the paint booth 151 the gear 46 and the work pieces 80 will be rotated so that, by means of an air brush, a workman may apply paint to the exteriors of the work pieces. Then the work pieces are conveyed through an inlet door 161 of a drying oven 160, which is heated by hot air entering through a duct 163, passing around baffles 160ª, and passing out through a duct 164 in the top of the oven. The work pieces are carried from the inlet opening 161 slowly toward the hottest part of the oven, during which time they are heated by work pieces which are traveling from the hottest part toward the outlet door 162. As each hanger comes to a certain point adjacent the unloading table 61, the switch wheel 120 adjacent thereto is operated to cause the transfer platform 75ª to function in the manner described in order to remove the work pieces automatically from the hanger. The empty hangers move in the direction of arrows 142 to the loading table 60.

It is apparent by means of the present invention that a large number of work pieces can be rapidly conveyed from a table upon which they are stacked, to a series of devices where the pieces are operated upon. The only manipulation required is that of stacking the pieces upon the loading table and removing them from the unloading table. The stacking of work pieces at the loading table is performed by the inspector who is normally employed to inspect the work pieces just before they are ready to be painted, in order to determine whether they are fit to be painted or should be rejected. The work pieces are removed from the transfer platform at the unloading table by the inespector normally employed to inspect the coating of paint to determine whether the painting is satisfactory or the piece should be rejected and repainted. It is apparent, therefore, that the cost of handling the work pieces from the time they are inspected before painting, until they are inspected after painting, has been entirely eliminated, since no manual labor is involved other than inspection which is necessary regardless of the method of handling the work pieces. Therefore, the cost of making work pieces of this type has been materially reduced.

While the form of embodiment of the invention as herein disclosed, constitutes a preferred form, it is to be understood that other forms might be adopted, all coming within the scope of the claims which follow.

What is claimed is as follows:

1. Work handling apparatus comprising, in combination, a conveyor including a hanger; an elevator adapted to receive a group of work pieces at one time and to lift the group up to the hanger; and means for securing the group to the hanger; and means automatically controlling the operation of the elevator in response to movement of the hanger relative to the elevator.

2. Work handling apparatus comprising in combination, a conveyor including a hanger; an elevator adapted to receive a plurality of work pieces arranged in stacked relation and lift them up to the hanger; means on the hanger for supporting said work pieces; and means automatically controlling the operation of the elevator in response to movement of the hanger relative to the elevator.

3. Work handling apparatus comprising in combination, a conveyor including a hanger; an elevator adapted to receive a plurality of work pieces arranged in stacked relation and lift them up to the hanger; means on the hanger for supporting said work pieces; means operated by the elevator for moving the supporting means into operative position and means for controlling the operation of the elevator in accordance with the relative position of the hanger.

4. Work handling apparatus comprising, in combination, tables having elevating platforms for receiving work pieces, a conveyor having hangers movable above and over the platforms and having members movable into one position for retaining work pieces upon the hanger or into another position to permit release of the work pieces, means responsive to movement of the hangers into certain positions for causing the platforms to be elevated in order to transfer the work to or from the hangers, means responsive to the elevation of one of the tables for causing the hanger member to be moved into position for retaining the work pieces upon the hanger, and means responsive to the elevation of the other table for causing the hanger member to be moved into position for releasing the work pieces.

5. Work handling apparatus comprising in combination, a conveyor including a hanger provided with a gripping latch at its free end; an elevator adapted to receive a plurality of cylindrically shaped work pieces in stacked relation; means for operating the elevator to lift the work pieces onto the hanger so that the gripping latch retains them; and means controlled by the operation of the conveyor for controlling the operation of the elevator.

6. Work handling apparatus comprising in combination, a conveyor including a hanger; an elevator adapted to receive a group of work pieces and to lift it up to the hanger; means for securing the work pieces to the hanger; a transfer platform adapted to remove the group of work pieces and lower it from the hanger; and devices for automatically controlling the operation of said elevator and transfer platform in accordance with the position of the hanger.

7. A work supporting hanger for a chain conveyor comprising, in combination, a bracket having a trunnion adapted to move along a track for supporting the bracket, and a work support suspended from the bracket and adapted to project through a stack of tubular work pieces, and having a member located adjacent the lower end of the support and movable into one position for retaining work pieces upon the support or to another position for releasing the work pieces from the support.

8. A work supporting hanger for a chain conveyor comprising, in combination, a bracket having a trunnion adapted to move along a track for supporting the bracket, and a work support comprising a plurality of spaced, vertically extending bars suspended from the bracket, a latch bracket attached to the lower ends of the bars and adapted with the bars to extend through a stack of tubular work pieces, and comprising a latch lever pivotally supported by the bracket and movable into one position to receive the lower edge of the lowest of the stack of work pieces, thereby retaining the work pieces upon the support, and movable into another position for releasing the work pieces.

9. Work handling apparatus comprising, in combination, a conveyor having work supporting devices each provided with a member movable into different positions for respectively retaining or releasing the work pieces, a table having a platform for receiving work pieces and movable toward and away from a supporting device, means for producing movement of the platform, means operated by movement of the supporting devices to a certain position for effecting operation of the platform moving means, and means operated by movement of the platform for moving into a certain position the work retaining member of the supporting device.

10. Work handling apparatus comprising, in combination, a conveyor having work supporting devices each provided with a member movable into different positions for respectively retaining or releasing the work pieces, a table having a platform for receiving work pieces and movable vertically toward and away from a supporting device, means for producing movement of the platform, means operated by movement of the supporting devices to a certain position for effecting operation of the platform moving means, and means operated by upward vertical movement of the platform for moving the work retaining member of the supporting device into one of its said positions.

11. Work handling apparatus comprising, in combination, a conveyor having work supporting devices each provided with a member movable into different positions for respectively retaining or releasing the work pieces, a table having a platform for receiving work pieces and movable toward and away from a supporting device, fluid pressure means for producing movement of the platform, an electric switch operated by movement of the supporting devices into a certain position, an electromagnetic valve controlled by the switch for controlling the fluid pressure actuating means, and means operated by movement of the platform for moving the work retaining member of the supporting device into one of its said positions.

12. Work handling apparatus comprising, in combination, a conveyor having work supporting devices each having a member movable into different positions for respectively retaining or releasing the work pieces, tables having similar work supporting platforms movable toward and away from the platform, similar apparatuses for producing movement of the table platforms toward the supporting devices, similar controlling devices responsive to movement of the supporting devices for causing the apparatuses to operate to move platforms toward the supporting devices and then to release the platforms to permit the platforms to recede from the supporting devices, and different cam members moved by the platforms and adapted to engage the retaining member of a supporting device and move it, respectively, to its retaining position, and to its releasing position.

13. Work handling apparatus comprising in combination, a conveyor including a hanger; a gripping latch at the free end of the hanger; an elevator adapted to receive a group of work pieces and lift it up to the hanger so that the gripping latch retains it on said hanger; a transfer platform adapted to engage the latch to release the group of work pieces and lower it from the hanger; and devices controlled by the operation of the conveyor for controlling the operation of the elevator and transfer platform in accordance with the positions of the hanger.

14. Work handling apparatus comprising in combination, a conveyor including hangers; a gripping latch at the free end of each hanger; an elevator including a platform upon which a plurality of cylindrically shaped work pieces are adapted to be placed in stacked relation; means for operating the elevator to move the work pieces about the hanger whereby the gripping latch will engage the lowest work piece to retain said stack upon the hanger; a transfer platform adapted to receive a stack of work pieces, said platform having means for operating the gripping latch to release the work pieces from the hanger whereby the lowering of the platform will remove the stack of work pieces from the hanger; and devices controlled by the operation of the conveyor to control the operation of the two elevators in accordance with the position of the hangers.

15. Work handling apparatus comprising in combination, a conveyor; hanger rods on said conveyor; an elevator platform adapted to receive hollow work pieces and place them around the hanger rods; means for retaining said work pieces on the hanger rods, when the work pieces have been lifted to a proper level; and means for operating the elevator platform.

16. Work handling apparatus comprising in combination, a conveyor; a hanger rod on said conveyor; an elevator platform adapted to receive a stack of cylindrically shaped work pieces and raise them so that they will surround the hanger rod; means on the free end of said hanger rod for retaining the work pieces thereon when they have been lifted to a proper level; and means for operating the elevator platform.

17. Work handling apparatus comprising in combination, a conveyor including a hanger; an elevator adapted to receive a group of work pieces and lift it up to the hanger; means for securing the work pieces to the hanger; and means for operating the elevator upwardly only when the hanger is directly above the elevator.

18. Work handling apparatus comprising, in combination, a conveyor supporting a hanger for receiving work pieces, means for latching work pieces to the hanger, a movable platform for supporting work pieces independently of the conveyor, and a member independent of the work pieces and actuated by the platform for controlling the latching means.

19. Work handling apparatus comprising, in combination, a conveyor, means for fastening work pieces to the conveyor, a second conveyor movable relative to the first and adapted to carry the work pieces, and a member independent of the work pieces and movable by the second conveyor for actuating the fastening means of the first conveyor.

In testimony whereof I hereto affix my signature.

RODGER J. EMMERT.